(12) United States Patent
Kulkarni et al.

(10) Patent No.: US 10,956,139 B2
(45) Date of Patent: Mar. 23, 2021

(54) INTEGRATION PROCESS TO INTEGRATION ADAPTER CONNECTOR

(71) Applicant: SAP SE, Walldorf (DE)

(72) Inventors: Gopalkrishna Kulkarni, Bangalore (IN); Sabarish T S, Bangalore (IN)

(73) Assignee: SAP SE, Walldorf (DE)

( * ) Notice: Subject to any disclaimer, the term of this patent is extended or adjusted under 35 U.S.C. 154(b) by 3 days.

(21) Appl. No.: 16/200,489

(22) Filed: Nov. 26, 2018

(65) Prior Publication Data

US 2020/0167141 A1 May 28, 2020

(51) Int. Cl.
 *G06F 8/60* (2018.01)

(52) U.S. Cl.
 CPC .................... *G06F 8/60* (2013.01)

(58) Field of Classification Search
 CPC .......................................................... G06F 8/60
 See application file for complete search history.

(56) References Cited

U.S. PATENT DOCUMENTS

| | | | |
|---|---|---|---|
| 7,962,582 B2 * | 6/2011 | Potti .................. | H04L 41/5012 709/220 |
| 8,677,317 B2 * | 3/2014 | Arnold ..................... | G06F 8/61 717/120 |
| 8,997,088 B2 * | 3/2015 | Gurikar ..................... | G06F 8/61 717/173 |
| 9,003,006 B2 * | 4/2015 | Xia ....................... | G06F 9/5072 709/223 |
| 9,009,667 B2 | 4/2015 | Stark et al. | |
| 10,044,639 B2 * | 8/2018 | Kimmet .................... | G06F 8/60 |
| 2003/0093575 A1 * | 5/2003 | Upton ..................... | G06F 9/542 719/310 |
| 2009/0183144 A1 * | 7/2009 | Aupperle ................ | G06F 9/541 717/137 |
| 2012/0036442 A1 * | 2/2012 | Dare ........................ | G06F 8/60 715/736 |
| 2013/0117747 A1 * | 5/2013 | Balko ..................... | G06F 9/485 718/100 |
| 2013/0159984 A1 * | 6/2013 | Misovski .................. | G06F 8/60 717/168 |
| 2013/0179876 A1 * | 7/2013 | Aliminati ............ | H04L 63/0209 717/177 |

(Continued)

FOREIGN PATENT DOCUMENTS

GB          2459681 A          11/2009

OTHER PUBLICATIONS

Wieland et al., "Towards a Rule-Based Manufacturing Integration Assistant", 2016, Elsevier B. V. (Year: 2016).*

(Continued)

*Primary Examiner* — Wei Y Zhen
*Assistant Examiner* — Junchun Wu
(74) *Attorney, Agent, or Firm* — Jones Day

(57) ABSTRACT

Deployment of computing environment is initiated. The computing environment includes at least one integration scenario and at least one adapter providing an interface to a backend computing system. Thereafter, a runtime component prevents activation of the at least one integration scenario until such time that the at least one adapter is fully deployed. Integration flows within the at least one integration scenario are subsequently enabled to utilize the at least one adapter. Related apparatus, systems, techniques and articles are also described.

17 Claims, 5 Drawing Sheets

(56) References Cited

U.S. PATENT DOCUMENTS

| | | | | |
|---|---|---|---|---|
| 2013/0346963 | A1* | 12/2013 | Hwang | G06F 8/61 717/176 |
| 2016/0013983 | A1* | 1/2016 | Lu | G06F 9/5077 709/226 |
| 2016/0092344 | A1* | 3/2016 | Bally | G06F 11/3684 717/124 |
| 2016/0162277 | A1* | 6/2016 | Fenzl | G06F 8/62 717/170 |
| 2016/0205175 | A1* | 7/2016 | Tirk | G06Q 30/0277 705/14.41 |
| 2016/0232042 | A1* | 8/2016 | Ritter | G06F 8/10 |
| 2018/0032399 | A1* | 2/2018 | Johnson | G06F 11/142 |
| 2018/0081702 | A1* | 3/2018 | Cohen | G06F 8/60 |
| 2019/0212990 | A1* | 7/2019 | Kulkarni | G06F 8/433 |
| 2019/0272162 | A1* | 9/2019 | Couillard | G06F 8/60 |

OTHER PUBLICATIONS

Orio et al., "The Adapter module: A building block for Self-Learning Production Systems", Jan. 2015, Elsevier Ltd. (Year: 2015).*

Ritter et al., "Modeling Exception Flows in Integration Systems", 2014, IEEE (Year: 2014).*

Lemrabet et al., "From BPMN 2.0 to the Setting-Up on an ESB—Application to an Interoperability Problem", 2010, IFIP, pp. 722-729 (Year: 2010).*

Malek et al., "An Extensible Framework for Improving a Distributed Software System's Deployment Architecture", 2011, IEEE (Year: 2011).*

Chen et al., "A Service Oriented Architecture for Enterprise Application Integration", 2007, IEEE (Year: 2007).*

Wagner et al., "A Methodology and Guide for Effective Reuse in Integration Architectures for Enterprise Applications", 2007, IEEE (Year: 2007).*

\* cited by examiner

INTEGRATION PROCESS TO INTEGRATION ADAPTER CONNECTOR

TECHNICAL FIELD

The subject matter described herein relates to a connector that couples integration adapters for extending the functionality of computer-implemented process flows forming part of integration scenarios.

BACKGROUND

Integration scenarios enable the definition of message exchange and process flow for computer-implemented collaborative processes (sometimes referred to herein as business processes). Such processes are often among different entities and are generally coupled by the exchange of messages amongst various computing nodes and/or applications. In particular, an integration scenario can provide a central point of access for all objects that are required for semantic and technical integration, such as interfaces and mappings.

SUMMARY

In one aspect, deployment of computing environment is initiated. The computing environment includes at least one integration scenario and at least one adapter providing an interface to a backend computing system. Thereafter, a runtime component prevents activation of the at least one integration scenario until such time that the at least one adapter is fully deployed. Integration flows within the at least one integration scenario are subsequently enabled to utilize the at least one adapter.

The preventing can include listening, by a deploy listener forming part of the runtime component, to events of an integration service forming part of the deployment to determine a state of deployment of the at least one adapter. The determined stated of deployment can be used to determine when the at least one adapter is fully deployed.

The at least one integration scenario can be an OSGi-based runtime integration scenario. With such an arrangement, the at least one adapter can be deployed using one or more adapter bundles.

The at least one integration scenario can be a Business Process Modeling Notation (BPMN) based runtime integration scenario.

The at least one integration scenario can have an associated manifest file that includes metadata characterizing other files forming part of the integration scenario. Such manifest file can be enriched with key values or other event related information during runtime.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter allows for the establishment of relationships between a consuming integration flow (forming part of an integration scenario) with that of an integration adapter which obviates the need for intervention should an integration scenario be deployed to runtime prior to a related adapter being deployed to runtime.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
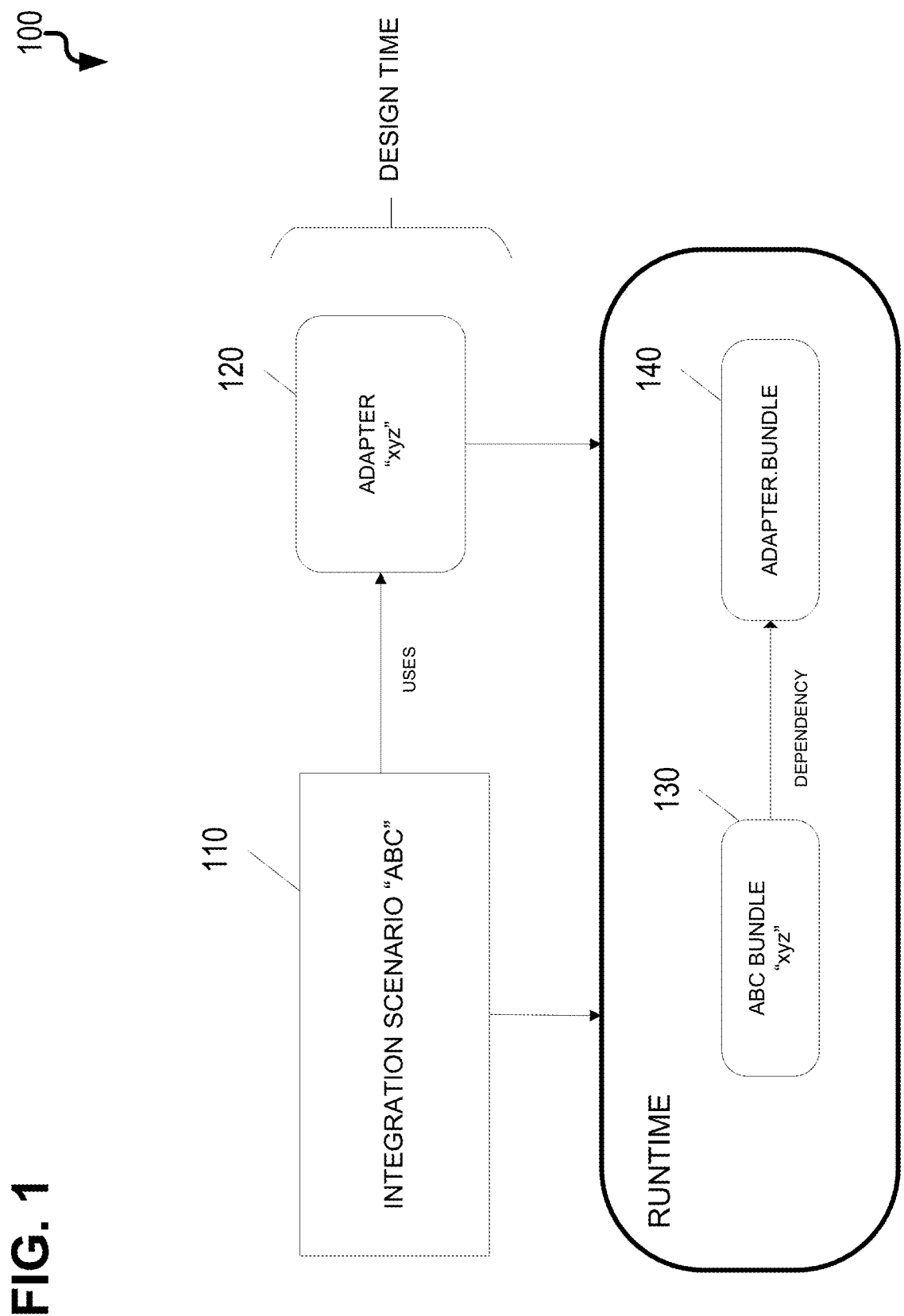
FIG. 1 is a diagram illustrating design time and runtime of an integration scenario and an adapter.

The current subject matter is directed to the deployment of complex integration scenarios that orchestrate complex computer-implemented processes across multiple computing nodes (also referred to herein as systems) and which utilize large numbers of data sources using different data access and/or transport protocols or formats. An integration scenario can take various forms such as a self-contained file or simply code (e.g., XML, etc.). The integration scenario provides requirements and interfaces/APIs amongst various applications and data sources to implement various processes to achieve a desired use case.

Integration scenarios can provide for integration of data sources (e.g., databases, local data stores, cloud-based data, etc.) for use by the processes specified by the integration scenarios. Integration in this regard can refer to a runtime component to transfer data from one system to another system including data transformation and/or how to format the files, and/or how data is transferred between nodes (e.g., FTP file transfer, etc.).

Integration scenarios include adapters (sometimes referred to as integration adapters) to connect to data sources. In particular, adapters define how data is communicated or exchanged between two systems.

Integration scenarios can be deployed in different manners. For example, the integration scenario can be .war file in a J2EE scenario or a jar/bundle file in an OSGi environment. The integration scenarios can take other configurations including APACHE GROOVY, XML, and/or configuration manifests. In any event, the integration scenario specifies the classes that need to be called during deployment and the specific order in which they are called (which is important for proper deployment).

Modifying integration scenarios, once deployed, often requires complete redeployment of such integration scenarios. As noted above, integration adapters can form part of integration scenarios and can be used to provide an interface (e.g., a connection) to a system/backend (e.g., a remote data source, a cloud, etc.). Often, such integration adapters are defined prior to deployment of an integration scenario (as opposed to the converse). If an integration framework provides ability to develop external adapters (e.g., SAP ADK), then it becomes important to have a link established between consuming integration flows with adapters such that integration flows will not run into unresolvable errors (thereby causing the associated processes to fail or otherwise malfunction). An integration scenario/integration flow/integration service is an artifact modeled to serve a particular integration use case and runs on an integration broker runtime.

For example, with reference to diagram 100, consider an integration scenario ABC 110 using an adapter xyz 120. With integration services, there is typically a design time phase during which an integration scenario will be built using a graphical user interface (GUI) based tool/development environment (such as an integration scenario builder UI 250 as in FIG. 2). The integration scenario 110 will later be deployed to a runtime (i.e., it will be made available/active, etc.) by way of an integration scenario bundle 130. Runtime, in this regard, can be a server or a tenant node in cloud catering to particular software type components. For example, a TomCat server can be called a runtime.

Similarly, in the case of OSGi, the external adapter 110 can also be deployed to a runtime by way of an adapter bundle 140 (or a JAVA JAR file with additional information, etc.). With continuing reference to FIG. 1, processes work properly if adapter 120 is deployed prior to the integration scenario ABC 110. However, automated jobs used to deploy the integration scenario ABC 110 and the adapter 120 do not always guarantee the order of such deployments. In cases in which an integration scenario with a consuming integration flow is first deployed first, such integration flow will need to wait until the adapter is deployed. This condition can result in unrecoverable state where specially in dynamic containers like those provided by OSGi (formerly known as Open Services Gateway initiative). Another issue can occur when the scenario bundle 130 goes to an error state which can require manual intervention to bring to active state after deploying the adapter 120. Such manual intervention of automated jobs such as software updates can be computationally expensive and additionally require downtime of systems.

The current subject matter is directed to establishing relationships between a consuming integration flow (forming part of an integration scenario) with that of an integration adapter. Such an arrangement is particular advantageous in frameworks such as an adapter development, OSGi based runtime, and BPMN (Business Process Modeling Notation) based integration scenarios. The subject matter provided herein can reuse adapter frameworks and can inject the relationship during the generation of runtime artifacts for the integration scenario. In this regard, inject the relationship can refer to dependency injection which, in turn, can refer to a technique whereby one object (or static method) supplies the dependencies of another object. Stated differently, a dependency is an object that can be used (a service). An injection is the passing of a dependency to a dependent object (a client) that would use it.

For example, consider an OSGi runtime environment and an APACHE Camel-based runtime artifact generation of the integration scenario. In this set up, both the integration scenario and the adapter can be the OSGi bundles. During the generation (i.e., design time) phase, a reusable component (e.g., an integration component such as a "XML to CSV transformer" which transforms a given XML file to a CSV representation, etc.) can add a require-capability tag to the manifest file for the integration scenario. This component understands the generation process and runtime environment. Stated differently, this example integration scenario consists of various steps one of which is a data conversion requirement (e.g., XML to CSV). This conversion is available as a reusable component in the runtime. When the integration process executes in runtime at the point of time when the data conversion has to happen the reusable runtime component has to be called. What is important here is that this runtime component is available and active prior to the execution of the process. The current subject matter is directed to how such dependencies can be managed in a complex integration runtime environment consisting of possibly several integration scenarios depending on several independent runtime components.

For example, in case in which the runtime is OSGi type, the component will add "requires-capability" tag to the manifest file of the generated integration scenario. The value of the "requires-capability" is the adapter's provide capability tag. Consider that the adapter "xyz" gives a capability tag as "xyz-cap" then the connector component will generate a new key in the manifest file as requires: "xyz-cap". The manifest file, in this regard, can be a file containing metadata for a group of accompanying files that are part of a set or coherent unit. For example, the files of a computer program may have a manifest describing the name, version number, license and the constituting files of the program. The manifest file can be generated as part of a generation phase which will be initiated after the deployment of the integration flow is triggered. Each component participating in an integration flow can have or trigger an event to update the manifest file.

Figure 2:
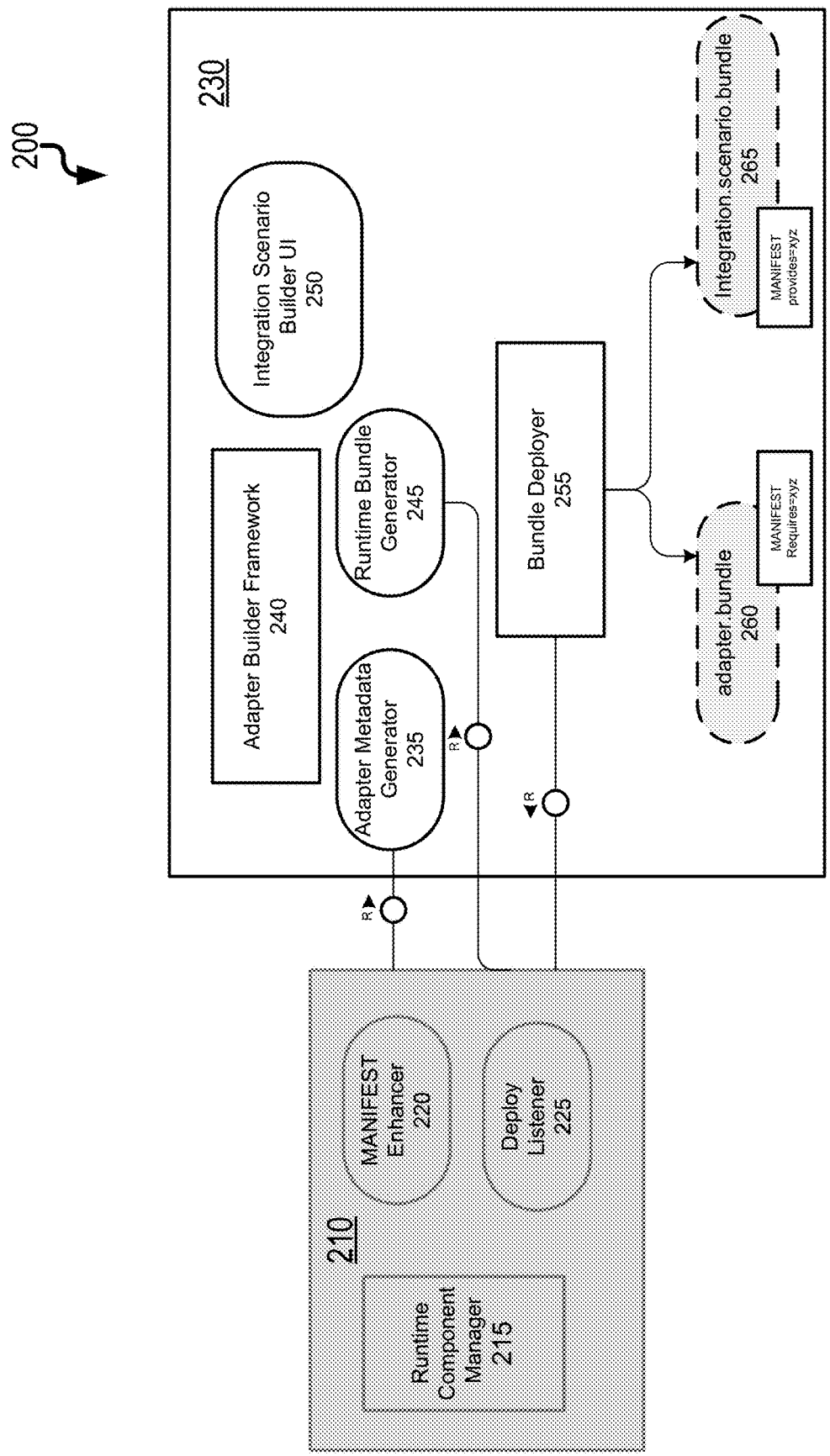
FIG. 2 is a diagram illustrating an integration scenario to adapter connector component in relation to an integration service with a custom adapter development framework.

With reference to diagram 200 of FIG. 2, a connector component 210 can have a runtime component manager 215 which can listen to all deploy events (provided by a deploy listener 220) and parse an associated manifest file (by a manifest enhancer 225). The deploy events can take various forms and can be analyzed in different ways by the deploy listener 220. For example, the deploy listener 220 can analyze the relationship between design time and runtime artifacts (and such analysis can comprise events).

The deploy events can also relate to how various systems, including systems for which status information is not readily available (e.g., customer systems, etc.) are being updated. The deploy events can also indicated whether adapters are working properly (by monitoring the data passing through such adapters). The deploy events can also indicate whether runtime bundles have properly started.

The runtime component manager 215 can be configured so that it does not attempt to activate the associated integration scenario and will wait for all deployment processes to finish (during software update). The ability to wait/start/restart a runtime component by the runtime component manager 215 can be acquired by getting the underlying runtime APIs. For example in OSGi environment this can be accessed using BundleContext.

As an example, a custom adapter will have a metadata, during build will add the "provides" attribute to this metadata let's say provides="xyz". The connector component 210 can provide an interface to establish the contract between an adapter development framework 240. The adapter development framework 240 implement this interface and can be called by an adapter metadata generator 235 during metadata creation to enhance the metadata.

An adapter bundle runtime generator 245 can use the metadata and enhance the manifest file or the runtime component with key values. For example, an adapter bundle 260 can be enriched with requires="xyz" and/or an integration scenario bundle 265 can be enriched with provides="xyz". The runtime bundle generator framework 240 can implement the connector interface to call the connector to cause the manifest enhanced 220 to enhance the manifest file.

If a file relates to the integration scenario, then during the generation phase, a "requires" key will be added by the manifest enhancer 220 to the manifest file such as, for example, requires="xyz".

The frameworks bundle deployer 255 can fire a deploy event which will be listened by the connector 210 and make sure that the ordering is followed. i.e. if an integration scenario is deployed first, then it will be made to wait till the corresponding required condition(s) is met. The waiting of a bundle to start can be achieved by using runtime container APIs for example in case of OSGi, the BundleContext and the bundle APIs can be used.

Figure 3:
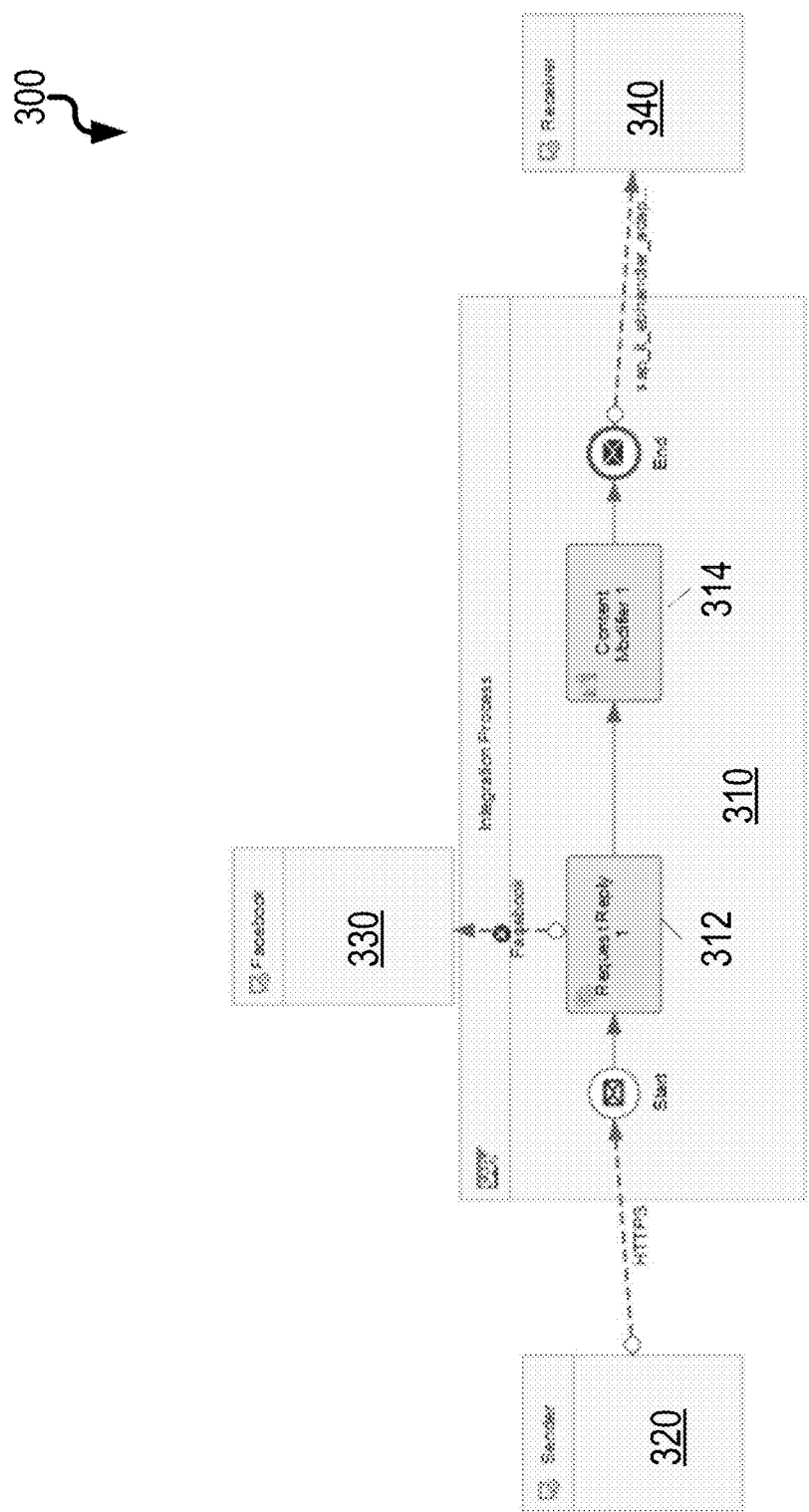
FIG. 3 is a diagram 300 illustrating an example integration process forming part of an integration scenario.

FIG. 3 is a system diagram 300 illustrating a process 310 forming part of an integration scenario in which data flow is defined amongst a sender 320, a social network 330, and a receiver 340 (all of which individually comprise at least one computing device). The process 310 defines HTTPs data transfer protocol between the sender 320 and the social network 330 as part of a request reply process. When the sender (320) receives a message, a call to Social Network (330) is made and response is propagated to next step (314). Stated differently, when certain conditions are met, a reply receiver from the social network 330 can be modified at 314 and such modified reply can be sent to the receiver 340. The receiver 340 is bound to the sender 310 by way of a specialized adapter forming part of an integration process.

Figure 4:
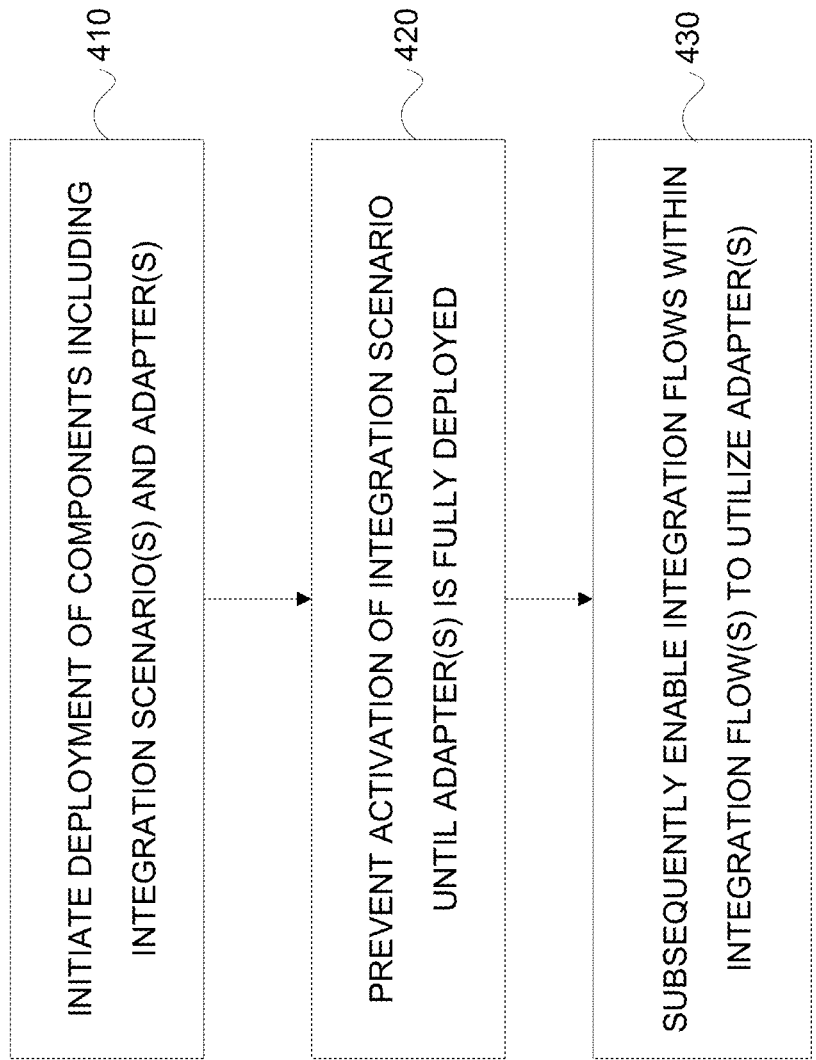
FIG. 4 is a process flow diagram for generating a connector between an integration flow (forming part of an integration scenario) to an integration adapter.

FIG. 4 is a process flow diagram illustrating an arrangement in which, at 410, deployment of a computing environment comprising a plurality of components including at least one integration scenario and at least one adapter is initiated. A runtime component, at 420, prevents activation of the at least one integration scenario until such time that the at least one adapter is fully deployed. Subsequently, at 430, integration flows within the at least one integration scenario are enabled to utilize the at least one adapter.

Figure 5:
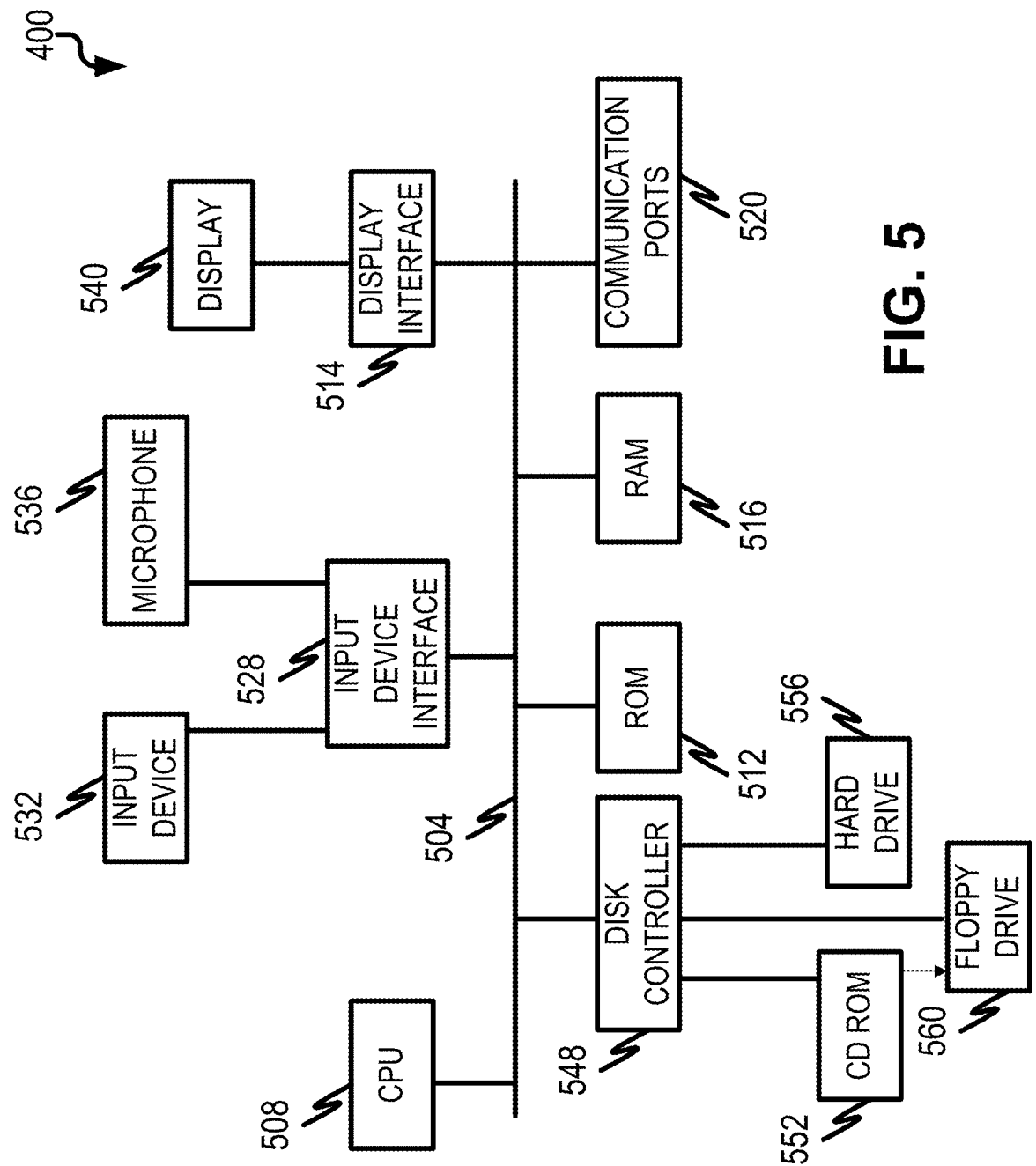
FIG. 5 is a diagram illustrating parts of a computing device for implementing subject matter described and illustrated herein.

FIG. 5 is a diagram 500 illustrating a sample computing device architecture for implementing various aspects described herein. A bus 504 can serve as the information highway interconnecting the other illustrated components of the hardware. A processing system 508 labeled CPU (central processing unit) (e.g., one or more computer processors/data processors at a given computer or at multiple computers), can perform calculations and logic operations required to execute a program. A non-transitory processor-readable storage medium, such as read only memory (ROM) 512 and random access memory (RAM) 516, can be in communication with the processing system 508 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 548 can interface with one or more optional disk drives to the system bus 504. These disk drives can be external or internal floppy disk drives such as 560, external or internal CD-ROM, CD-R, CD-RW or DVD, or solid state drives such as 552, or external or internal hard drives 556. As indicated previously, these various disk drives 552, 556, 560 and disk controllers are optional devices. The system bus 504 can also include at least one communication port 520 to allow for communication with external devices either physically connected to the computing system or available externally through a wired or wireless network. In some cases, the communication port 520 includes or otherwise comprises a network interface.

To provide for interaction with a user, the subject matter described herein can be implemented on a computing device having a display device 540 (e.g., a CRT (cathode ray tube) or LCD (liquid crystal display) monitor) for displaying information obtained from the bus 504 via the display interface 514 to the user and an input device 532 such as keyboard and/or a pointing device (e.g., a mouse or a trackball) and/or a touchscreen by which the user can provide input to the computer. Other kinds of input devices 532 can be used to provide for interaction with a user as well; for example, feedback provided to the user can be any form of sensory feedback (e.g., visual feedback, auditory feedback by way of a microphone 536, or tactile feedback); and input from the user can be received in any form, including acoustic, speech, or tactile input. The input device 532 and the microphone 536 can be coupled to and convey information via the bus 504 by way of an input device interface 528. Other computing devices, such as dedicated servers, can omit one or more of the display 540 and display interface 514, the input device 532, the microphone 536, and input device interface 528.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) and/or a touch screen by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for implementation by one or more data processors forming part of at least one computing device comprising:
    initiating deployment of a computing environment comprising a plurality of components including at least one integration scenario and at least one adapter providing an interface to a backend computing system, wherein the integration scenario defines message exchange and process flows for computer-implemented collaborative processes executing across multiple computing nodes which utilize a plurality of data sources having different access or transport formats;
    preventing, by a runtime component, activation of the at least one integration scenario until such time that the at least one adapter is fully deployed, the preventing including:
    listening, by a deploy listener forming part of the runtime component, to events of an integration service forming part of the deployment to determine a state of deployment of the at least one adapter, wherein the events are based on relationships between design time and runtime artifacts and indicate that runtime bundles forming part of the integration scenario have been properly started; and
    subsequently enabling integration flows within the at least one integration scenario to utilize the at least one adapter;
    wherein the determined state of deployment is based on an amount of monitored data passing through the at least one adapter and is used to determine when the at least one adapter is fully deployed.

2. The method of claim 1, wherein the at least one integration scenario is an OSGi-based runtime integration scenario.

3. The method of claim 2 further comprising deploying the at least one adapter using one or more adapter bundles.

4. The method of claim 1, wherein the at least one integration scenario is a Business Process Modeling Notation (BPMN) based runtime integration scenario.

5. The method of claim 1, wherein the at least one integration scenario has an associated manifest file that includes metadata characterizing other files forming part of the integration scenario.

6. The method of claim 5 further comprising:
    enriching the manifest file with key values or events during runtime.

7. The method of claim 1, wherein the events comprise status information for remote computing systems.

8. The method of claim 1, wherein the events indicate whether runtime bundles forming part of the integration scenario have been properly started.

9. A system comprising:
    at least one data processor; and
    memory storing instructions which, when executed by the at least one data processor, result in operations comprising:
        initiating deployment of a computing environment comprising a plurality of components including at least one integration scenario and at least one adapter providing an interface to a backend computing system, wherein the integration scenario defines message exchange and process flows for computer-implemented collaborative processes executing across multiple computing nodes which utilize a plurality of data sources having different access or transport formats;

preventing, by a runtime component, activation of the at least one integration scenario until such time that the at least one adapter is fully deployed, the preventing including:

listening, by a deploy listener forming part of the runtime component, to events of an integration service forming part of the deployment to determine a state of deployment of the at least one adapter, wherein the events are based on relationships between design time and runtime artifacts and indicate that runtime bundles forming part of the integration scenario have been properly started; and subsequently enabling integration flows within the at least one integration scenario to utilize the at least one adapter;

wherein the determined state of deployment is based on monitored data passing through the at least one adapter and is used to determine when the at least one adapter is fully deployed.

10. The system of claim 9, wherein the at least one integration scenario is an OSGi-based runtime integration scenario.

11. The system of claim 10, wherein the operations further comprise deploying the at least one adapter using one or more adapter bundles.

12. The system of claim 9, wherein the at least one integration scenario is a Business Process Modeling Notation (BPMN) based runtime integration scenario.

13. The system of claim 9, wherein the at least one integration scenario has an associated manifest file that includes metadata characterizing other files forming part of the integration scenario.

14. The system of claim 13, wherein the operations further comprise: enriching the manifest file with key values during runtime.

15. The system of claim 9, wherein the events further indicate at least one of: status information for remote computing systems, or whether runtime bundles forming part of the integration scenario have been properly started.

16. A non-transitory computer program product storing instructions which, when executed by at least one data processor forming part of at least one computing device, result in operations comprising:

initiating deployment of a computing environment comprising a plurality of components including at least one integration scenario and at least one adapter providing an interface to a backend computing system, wherein the integration scenario defines message exchange and process flows for computer-implemented collaborative processes executing across multiple computing nodes which utilize a plurality of data sources having different access or transport formats;

preventing, by a runtime component, activation of the at least one integration scenario until such time that the at least one adapter is fully deployed, the preventing including:

listening, by a deploy listener forming part of the runtime component, to events of an integration service forming part of the deployment to determine a state of deployment of the at least one adapter, wherein the events are based on relationships between design time and runtime artifacts and indicate that runtime bundles forming part of the integration scenario have been properly started; and subsequently enabling integration flows within the at least one integration scenario to utilize the at least one adapter;

wherein the determined state of deployment is based on monitored data passing through the at least one adapter and is used to determine when the at least one adapter is fully deployed.

17. The computer program product of claim 16, wherein the events further indicate status information for remote computing systems.

* * * * *